C. VON WITZLEBEN.
Improvement in Treating Saccharine Liquids.

No. 128,440. Patented June 25, 1872.

Witnesses:
E. G. Kastenhuber
C. Wahlers

Inventor:
Carl von Witzleben 128,440

UNITED STATES PATENT OFFICE.

CARL VON WITZLEBEN, OF BERLIN, PRUSSIA.

IMPROVEMENT IN TREATING SACCHARINE LIQUIDS.

Specification forming part of Letters Patent No. 128,440, dated June 25, 1872.

*To all whom it may concern:*

Be it known that I, CARL VON WITZLEBEN, of Berlin, Prussia, in the German Empire, have invented a new and useful Improvement in Treating Saccharine Liquids; and I do hereby declare the following to be a full, clear, and exact description thereof, which will enable those skilled in the art to make and use the same, reference being had to the accompanying drawing forming part of this specification, in which drawing—

Figure 1:
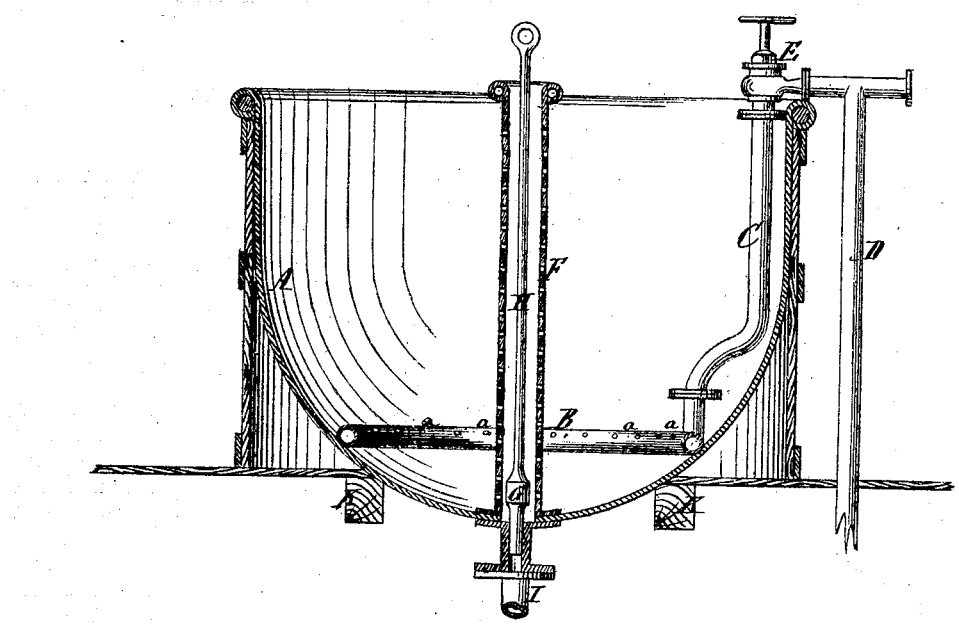
Figure 2:
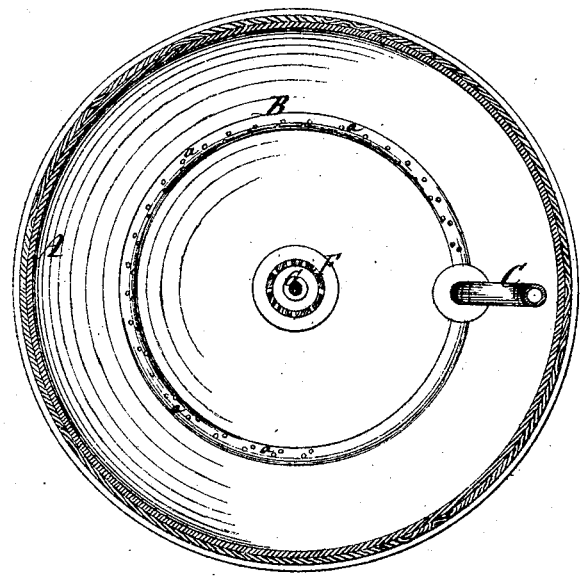

Figure 1 represents a vertical section of the apparatus which I use in carrying out my invention. Fig. 2 is a horizontal section of the same.

Similar letters indicate corresponding parts.

This invention consists in a process for separating impurities from saccharine liquids by exposing the same to the action of steam applied so as to heat the mass of the liquid and impart to it a rotary motion, thereby causing the impurities to rise to the surface. My apparatus consists, principally, of a circular steam-pipe situated at or near the bottom of a pan in which the saccharine liquid is heated, said pipe being perforated at a portion of its circumference, in combination with a tubular sieve rising from the center of the pan and closed at its bottom by a suitable valve in such a manner that, by the steam issuing from the perforations in the circular pipe a rotary motion is imparted to the liquid, whereby the separation of the impurities is materially facilitated, and at the same time the clear liquid can be readily drawn off through the valve in the bottom of the tubular sieve. This invention is based on the quality of sugar, in consequence of which the impurities mixed with the same always have a tendency to separate from the sugar at a high temperature, particularly if, in addition to the increase in the temperature, by some means a violent rotating motion is imparted to the same.

In order to turn this quality of the sugar to a useful purpose, I have constructed my apparatus, which is represented in the accompanying drawing.

In the drawing, the letter A designates a pan made of copper or any other suitable material. At a short distance from the bottom of this pan is situated a circular pipe, B, which connects, by a pipe, C, with a steam supply-pipe, D, a stop-cock, E, being provided for the purpose of shutting off the steam, as may be desired. The coil B is provided with a series of holes, $a$, extending over three-fourths of its circumference and arranged in oblique rows, forming portions of a spiral, as shown in Fig. 2. From the center of the pan rises a pipe, F, which is perforated throughout its entire height with a large number of holes, so as to form a sieve, and the bottom of which is bored out to receive a plug, G, which is secured to a rod, H, extending up through the tubular sieve F. If this plug is raised the liquid contents of the pan discharge through said sieve, while the impurities which have been separated are retained. From the bottom of the tubular sieve extends a pipe, I, which conducts the liquid discharging from the pan to the filtering apparatus. The pan A is surrounded by a jacket, of wood, and it is supported on beams K, as shown in Fig. 1.

The saccharine liquid is pumped into the pan, and then a current of steam is admitted until the liquid has attained a strength of from 27° to 28° Baumé. The current of steam is then increased, and thereby a whirling motion is imparted to the liquid, which extends to the surface and causes the impurities to rise, so that the same, after the current of steam has been reduced, can be readily removed by means of a perforated scoop. The current of steam is then again increased, and the operation is continued until the formation of scum ceases. Then steam is shut off, and the liquid is allowed to discharge by raising the plug G.

What I claim as new, and desire to secure by Letters Patent, is—

1. The arrangement of a circular steam-pipe, situated at or near the bottom of the pan in which the saccharine liquid is heated, said pipe being perforated at a portion of its circumference only, in combination with a tubular sieve situated at or near the center of the pan and closed by a suitable valve, as herein described, so that by the steam issuing from the perforations in the circular pipe a rotary motion is imparted to the liquid, whereby the separation of the impurities is materially facilitated, while the clear liquid can be drawn off through the valve in the tubular sieve.

2. The within-described process of separating impurities from saccharine liquids by exposing the same to the action of steam applied so as to heat the mass of the liquid and impart to it a rotating motion, whereby the impurities are caused to rise to the surface, as set forth.

CARL VON WITZLEBEN.

Witnesses:
 PAUL SCHULZE,
 ANDROAS MEIER.